(12) United States Patent
Zia et al.

(10) Patent No.: US 11,947,343 B1
(45) Date of Patent: Apr. 2, 2024

(54) SYSTEM AND METHOD FOR OPTIMIZING INDUSTRIAL ASSEMBLY PROCESSES

(71) Applicant: RETROCAUSAL, INC., Redmond, WA (US)

(72) Inventors: Muhammad Zeeshan Zia, Sammamish, WA (US); Quoc-Huy Tran, Redmond, WA (US); Andrey Konin, Redmond, WA (US)

(73) Assignee: Retrocausal, Inc., WA (US)

( * ) Notice: Subject to any disclaimer, the term of this patent is extended or adjusted under 35 U.S.C. 154(b) by 0 days.

(21) Appl. No.: 18/460,742

(22) Filed: Sep. 5, 2023

Related U.S. Application Data

(60) Provisional application No. 63/456,753, filed on Apr. 3, 2023.

(51) Int. Cl.
    *G05B 19/418* (2006.01)
(52) U.S. Cl.
    CPC ... *G05B 19/4185* (2013.01); *G05B 19/41805* (2013.01)
(58) Field of Classification Search
    USPC .......................................................... 700/95
    See application file for complete search history.

(56) References Cited

U.S. PATENT DOCUMENTS

| 2018/0253082 A1* | 9/2018 | Asenjo | G06Q 10/06 |
| 2023/0169071 A1* | 6/2023 | Nalala Pochaiah | G05B 23/0272 707/767 |
| 2023/0252083 A1* | 8/2023 | Preis | G06N 20/00 706/11 |
| 2023/0297082 A1* | 9/2023 | Heindl | G05B 19/4187 700/97 |
| 2023/0342354 A1* | 10/2023 | Nalala Pochaiah | G05B 23/0272 |

\* cited by examiner

*Primary Examiner* — Hien D Khuu
(74) *Attorney, Agent, or Firm* — Jason C. Cameron

(57) ABSTRACT

A system and method for optimizing industrial assembly process in an industrial environment is disclosed. A system operates on artificial intelligence (AI) based conversational/GUI platform, where it receives user commands related to industrial assembly process improvement queries. By analyzing received user commands, system identifies type of industrial assembly process mentioned by extracting relevant keywords or other attributes. Using trained AI-based classification table, system determines performance attributes associated with identified type of process. The system leverages various sources such as domain knowledge, organization-specific knowledge bases, data from tools/internet-based services, and statistical measurements from industrial environment. Based on results from language model, system generates a response to user command, which can include insights on performance level of industrial assembly or packaging process, recommendations for improvements, and actuation commands for operating machinery in industrial environment. Finally, system outputs generated response on AI-based conversational/GUI platform in multiple representation forms.

18 Claims, 6 Drawing Sheets

SYSTEM AND METHOD FOR OPTIMIZING INDUSTRIAL ASSEMBLY PROCESSES

CROSS-REFERENCE TO RELATED APPLICATION(S)

This application claims the priority to incorporate by reference the entire disclosure of U.S. Provisional Patent Application No. 63/456,753, filed on Apr. 3, 2023, and titled "System and method for using language models for industrial process management".

TECHNICAL FIELD

Embodiments of the present disclosure generally relate to industrial and warehouse process planning and analysis systems and more particularly relates to a system and a method for optimizing industrial assembly or packaging processes in an industrial environment.

BACKGROUND

Generally, industrial engineers and other similar professionals design and improve industrial processes by combining domain expertise, organizational knowledge, external knowledge, and tedious manual observations such as time studies, ergonomic assessments, and yield estimates, and the like. Insights generated by the industrial engineers are fundamental for enabling people to effectively work together and turn a manufacturing or warehousing operation into a sustainable business. Industrial engineers gain domain expertise by going through rigorous educational and training programs in universities and industries. Furthermore, the industrial engineers need to constantly update their general-purpose domain knowledge by reading books, trade magazines, and technical papers. Industrial engineers apply this knowledge and skillset to create and continuously improve industrial processes during their work.

Further, the industrial engineers access various organization-specific knowledge bases in an organization e.g., continuous improvement (CI) systems, quality management systems (QMS), and enterprise resource planning (ERP) systems amongst others. In addition to benefiting from organizational knowledge, the industrial engineers and other professionals within the organization are also constantly recording new insights into the knowledge-bases, e.g., after they perform an event on a process to improve it. However, often the knowledge bases are very large and it is difficult for the industrial engineers to arrive at the relevant bits when needed. For large organizations with plurality of factories, there is no effective way to propagate insights across the organization apart from recording them in obscure spreadsheet formats which feed into these knowledgebases, which are again difficult to search.

Furthermore, industrial engineers and similar professionals also perform manual observations of processes and equipment on the factory floor, e.g., the measure cycle-times of an assembly process or estimate body movements of a workerwhile performing a process. Sometimes industrial engineers and similar professionals use automated or semi-automated systems to perform these observations.

Additionally, the industrial engineers leverage tools such as calculators and external knowledge sources such as various third-party internet repositories.

Consequently, there is a need for an improved system and method for suggesting and executing improvements for industrial assembly or packaging processes in a computing environment, using artificial intelligence (AI) and machine learning (ML) models, based on combining sources of knowledge for industrial assembly or packaging processes.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

An aspect of the present disclosure provides a computer-implemented system for optimizing industrial assembly processes in an industrial environment. The system receives a user command from a user on at least one of an artificial intelligence (AI) based conversational platform and a graphical user interface platform. The user command comprises a query associated with an industrial assembly process.

Further, the system identifies a type of the industrial assembly process indicated in the received user command by extracting at least one of one or more keywords and interaction of visual elements comprised in the received user command. Furthermore, the system determines one or more performance attributes associated with the identified type of industrial assembly process based on a trained AI based classification table. Additionally, the system applies the determined one or more performance attributes to a trained AI based language model. The determined one or more performance attributes are mapped to at least one of domain knowledge, data associated with organization-specific knowledge bases, data from tools and internet-based services, and statistics and measurements obtained from an industrial environment. Further, the system generates a response to the received user command based on results of the trained AI based language model. The response comprises at least one of one or more insights on performance level of the industrial assembly process, recommendations to current industrial assembly process, and actuation commands to operate one or more machinery deployed in an industrial environment. Furthermore, the system outputs the generated response on at least one of the AI based conversational platform and a graphical user interface platform in one or more representation forms.

Another aspect of the present disclosure provides a computer-implemented method for optimizing industrial assembly process in an industrial environment. The method includes receiving a user command from a user on at least one of an artificial intelligence (AI) based conversational platform and a graphical user interface platform. The user command comprises a query associated with an industrial assembly process. Further, the method includes identifying a type of the industrial assembly process indicated in the received user command by extracting at least one of one or more keywords and interaction of visual elements comprised in the received user command. Furthermore, the method includes determining one or more performance attributes associated with the identified type of industrial assembly process based on a trained AI based classification table. Additionally, the method includes applying the determined one or more performance attributes to a trained AI based language model. The determined one or more performance attributes are mapped to at least one of domain knowledge, data associated with organization-specific knowledge bases, data from tools and internet-based services, and statistics and measurements obtained from an industrial environment.

Further, the method includes generating a response to the received user command based on results of the trained AI based language model. The response comprises at least one of one or more insights on performance level of the industrial assembly process, recommendations to current industrial assembly process, and actuation commands to operate one or more machinery deployed in the industrial environment. Furthermore, the method includes outputting the generated response on at least one of the AI based conversational platform and the graphical user interface platform in one or more representation forms.

Yet another aspect of the present disclosure provides a non-transitory computer-readable storage medium having programmable instructions stored therein. That when executed by one or more hardware processors cause the one or more hardware processors to receive a user command from a user on at least one of an artificial intelligence (AI) based conversational platform and a graphical user interface platform. The user command comprises a query associated with an industrial assembly process. Further, the one or more hardware processors identifies a type of the industrial assembly process indicated in the received user command by extracting at least one of one or more keywords and interaction of visual elements comprised in the received user command. Furthermore, the one or more hardware processors determines one or more performance attributes associated with the identified type of industrial assembly process based on a trained AI based classification table. Additionally, the one or more hardware processors applies the determined one or more performance attributes to a trained AI based language model. The determined one or more performance attributes are mapped to at least one of domain knowledge, data associated with organization-specific knowledge bases, data from tools and internet-based services, and statistics and measurements obtained from an industrial environment. Further, the one or more hardware processors generate a response to the received user command based on results of the trained AI based language model. The response comprises at least one of one or more insights on performance level of the industrial assembly process, recommendations to current industrial assembly process, and actuation commands to operate one or more machinery deployed in the industrial environment. Furthermore, the one or more hardware processors output the generated response on at least one of the AI based conversational and the graphical user interface platform in one or more representation forms.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF ACCOMPANYING DRAWINGS

The disclosure will be described and explained with additional specificity and detail with the accompanying figures in which.

Figure 1:
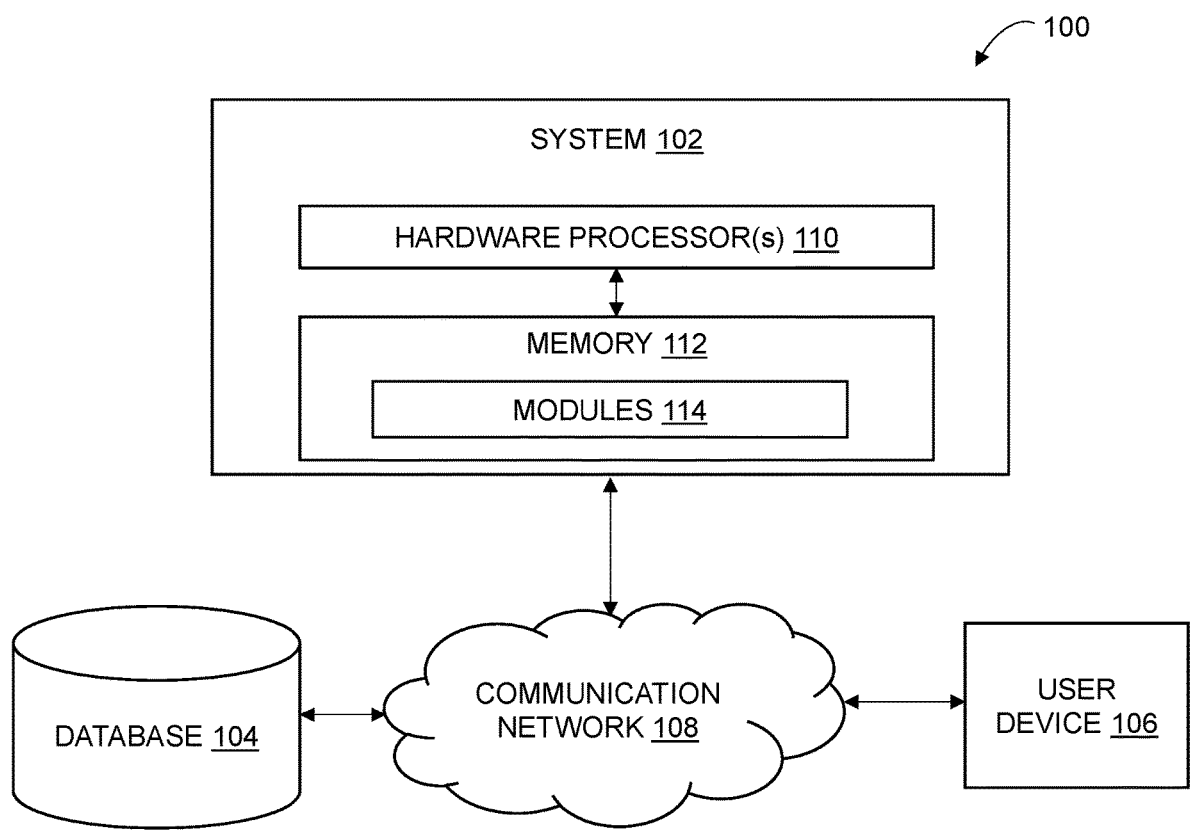
FIG. 1 illustrates an exemplary block diagram representation of a network architecture implementing a system for optimizing industrial assembly process in an industrial environment, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client, or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or a "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired), or temporarily configured (programmed) to operate in a certain manner and/or to perform certain operations described herein.

Embodiments of the present disclosure provide a system and a method for optimizing industrial assembly process in an industrial environment. The present disclosure utilizes language models (LMs) to combine multiple sources of knowledge, including domain expertise, organizational knowledge, external knowledge from tools and internet-based services, and observations from the factory floor. The present disclosure leverages the sources of knowledge to suggest improvements to existing industrial processes. By utilizing the diverse knowledge available, the LMs may generate valuable insights and recommend enhancements that can boost productivity, quality, and safety. The present disclosure utilizes the combined knowledge sources to design new industrial processes. By drawing upon domain expertise, organizational knowledge, external resources, and real-time observations, the LMs can contribute to the creation of innovative and efficient processes. Further, the present disclosure utilizes source of knowledge that are employed to autonomously implement improvements. The LMs can analyze the data, identify areas for enhancement, and trigger actions by autonomous machinery, reducing the need for manual intervention and facilitating continuous optimization. The present disclosure involves training the LMs on material related to industrial and manufacturing engineering. This specialized training allows the LMs to answer questions related to industrial engineering problems effectively.

Additionally, the LMs can utilize organization-specific knowledge bases and factory floor analytics, similar to industrial engineers, enhancing their capabilities and relevance to the industrial domain. The present disclosure enables conversational access to organization-specific knowledge bases. Users, such as industrial engineers, may ask questions related to their specific use cases, and the LMs can rapidly provide relevant answers by leveraging the knowledge contained within these bases. This facilitates quick and efficient access to valuable information. Additionally, the LMs may be trained to call application programming interfaces (APIs) and access analytical systems. This integration allows the LMs to fetch real-time data from various sources, such as Internet-of-Things infrastructure on the factory floor, third-party software, services such as calculators and search engines, and statistics generated by monitoring systems. By incorporating these data points, the LMs can perform advanced computational reasoning, draw novel conclusions, and generate valuable insights. The present disclosure enables LMs to call APIs that fetch knowledge from organization-specific knowledge bases. This capability ensures that the LMs can access fresh and up-to-date knowledge whenever needed, without requiring retraining. It enables the system to adapt dynamically to changes in the knowledge bases, providing the most current information. The present disclosure provides a system and a method for performing API calls to access third-party software and services, such as calculators and internet search engines, to perform the tasks of the industrial engineer effectively. This expands the system's capabilities beyond a conversational frontend and allows it to leverage external resources to accomplish various tasks efficiently.

FIG. 1 illustrates an exemplary block diagram representation of a network architecture 100 implementing a system 102 for optimizing industrial assembly process in an industrial environment, in accordance with an embodiment of the present disclosure. According to FIG. 1, the network architecture 100 may include the system 102, a database 104, and a user device 106. The system 102 may be communicatively coupled to the database 104, and the user device 106 via a communication network 108. The communication network 108 may be a wired communication network and/or a wireless communication network. The database 104 may include, but is not limited to, industrial data, manufacturing domain data, skills data, organization-specific data, continuous improvement (CI) data, quality management system (QMS) data, enterprise resource planning (ERP) data, external tools data, knowledge services data, factory floor data, logistics chain statistics data, internet of things (IoT) analytics data, image data, and sensor data, any other data, and combinations thereof. The database 104 may be any kind of database such as, but are not limited to, relational databases, dedicated databases, dynamic databases, monetized databases, scalable databases, cloud databases, distributed databases, any other databases, and combination thereof.

Further, the user device 106 may be associated with, but not limited to, a user, an individual, an administrator, a vendor, a technician, a worker, a specialist, an instructor, a supervisor, a team, an entity, an organization, a company, a facility, a bot, any other user, and combination thereof. The entities, the organization, and the facility may include, but are not limited to, a hospital, a healthcare facility, an exercise facility, a laboratory facility, an e-commerce company, a merchant organization, an airline company, a hotel booking company, a company, an outlet, a manufacturing unit, an enterprise, an organization, an educational institution, a secured facility, a warehouse facility, a supply chain facility, any other facility and the like. The user device 106 may be used to provide input and/or receive output to/from the system 102, and/or to the database 104, respectively. The user device 106 may present to the user one or more user interfaces for the user to interact with the system 102 and/or to the database 104 for industrial assembly process optimizing needs. The user device 106 may be at least one of, an electrical, an electronic, an electromechanical, and a computing device. The user device 106 may include, but is not limited to, a mobile device, a smartphone, a personal digital assistant (PDA), a tablet computer, a phablet computer, a wearable computing device, a virtual reality/augmented reality (VR/AR) device, a laptop, a desktop, a server, and the like.

Further, the system 102 may be implemented by way of a single device or a combination of multiple devices that may be operatively connected or networked together. The system 102 may be implemented in hardware or a suitable combination of hardware and software. The system 102 includes one or more hardware processor(s) 110, and a memory 112. The memory 112 may include a plurality of modules 114. The system 102 may be a hardware device including the hardware processor 110 executing machine-readable program instructions for optimizing industrial assembly process in an industrial environment. Execution of the machine-readable program instructions by the hardware processor 110 may enable the proposed system 102 to optimize industrial assembly process in an industrial environment. The "hardware" may comprise a combination of discrete components, an integrated circuit, an application-specific integrated circuit, a field-programmable gate array, a digital signal processor, or other suitable hardware. The "software" may comprise one or more objects, agents, threads, lines of code, subroutines, separate software applications, two or more lines of code, or other suitable software structures operating in one or more software applications or on one or more processors.

The one or more hardware processors 110 may include, for example, microprocessors, microcomputers, microcontrollers, digital signal processors, central processing units, state machines, logic circuits, and/or any devices that manipulate data or signals based on operational instructions. Among other capabilities, hardware processor 110 may fetch and execute computer-readable instructions in the memory 112 operationally coupled with the system 102 for performing tasks such as data processing, input/output processing, and/or any other functions. Any reference to a task in the present disclosure may refer to an operation being or that may be performed on data.

Though few components and subsystems are disclosed in FIG. 1, there may be additional components and subsystems which is not shown, such as, but not limited to, ports, routers, repeaters, firewall devices, network devices, databases, network attached storage devices, servers, assets, machinery, instruments, facility equipment, emergency management devices, image capturing devices, any other devices, and combination thereof. The person skilled in the art should not be limiting the components/subsystems shown in FIG. 1. Although FIG. 1 illustrates the system 102, and the user device 106 connected to the database 104, one skilled in the art can envision that the system 102, and the user device 106 can be connected to several user devices located at different locations and several databases via the communication network 108.

Those of ordinary skilled in the art will appreciate that the hardware depicted in FIG. 1 may vary for particular implementations. For example, other peripheral devices such as an optical disk drive and the like, local area network (LAN), wide area network (WAN), wireless (e.g., wireless-fidelity (Wi-Fi)) adapter, graphics adapter, disk controller, input/output (I/O) adapter also may be used in addition or place of the hardware depicted. The depicted example is provided for explanation only and is not meant to imply architectural limitations concerning the present disclosure.

Those skilled in the art will recognize that, for simplicity and clarity, the full structure and operation of all data processing systems suitable for use with the present disclosure are not being depicted or described herein. Instead, only so much of the system 102 as is unique to the present disclosure or necessary for an understanding of the present disclosure is depicted and described. The remainder of the construction and operation of the system 102 may conform to any of the various current implementations and practices that were known in the art.

In an exemplary embodiment, the system 102 may receive a user command from a user on at least one of an artificial intelligence (AI) based conversational platform and a graphical user interface platform (not shown), The user command includes a query associated with an industrial assembly process. In an exemplary embodiment, the system 102 may identify a type of the industrial assembly process indicated in the received user command by extracting at least one of one or more keywords and interaction of visual elements comprised in the received user command. In an exemplary embodiment, the system 102 may determine one or more performance attributes associated with the identified type of industrial assembly process based on a trained AI based classification table.

In an exemplary embodiment, the system 102 may apply the determined one or more performance attributes to a trained AI based language model. The AI based model may be language models (LMs). The LMs may be trained using, but not limited to, general purpose transformers (GPT), reinforcement learning through human feedback (RLHF) approaches, and the like. The determined one or more performance attributes are mapped to, but not limited to, domain knowledge, data associated with organization-specific knowledge bases, data from tools and internet-based services, statistics and measurements obtained from an industrial environment, and the like.

In an exemplary embodiment, the system 102 may generate a response to the received user command based on results of the trained AI based language model. The response includes, but not limited to, one or more insights on performance level of the industrial assembly process, recommendations to current industrial assembly process, actuation commands to operate one or more machinery deployed in the industrial environment, and the like.

In an exemplary embodiment, the system 102 may output the generated response on at least one of the AI based conversational platform and a graphical user interface platform in one or more representation forms. In an exemplary embodiment, the system 102 may simulate the generated response in a simulation environment based on the results of the trained AI based language model.

Figure 2:
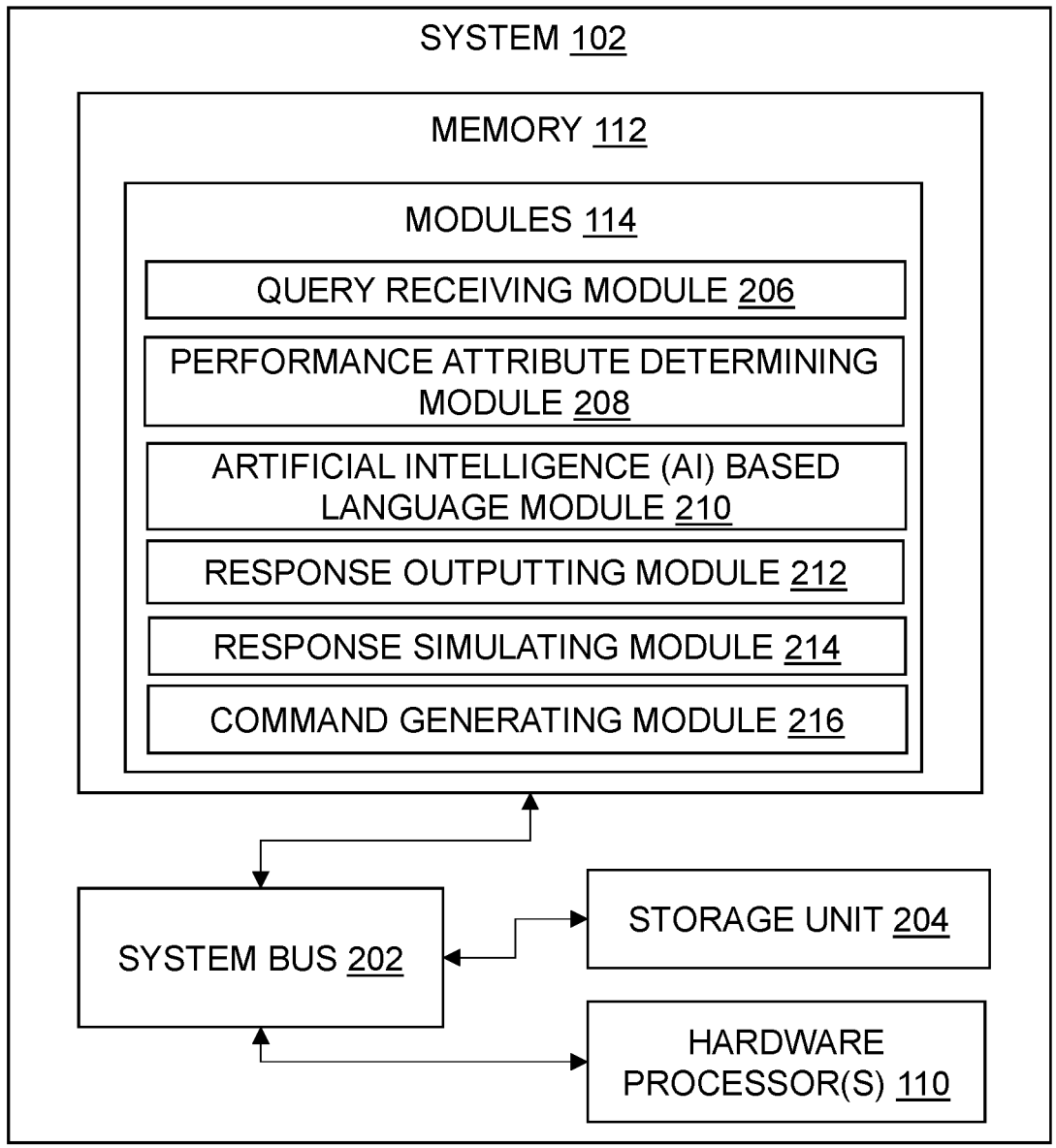
FIG. 2 illustrates an exemplary block diagram representation of a computer-implemented system, such as those shown in FIG. 1, capable of optimizing industrial assembly process in an industrial environment, in accordance with an embodiment of the present disclosure.

FIG. 2 illustrates an exemplary block diagram representation of a computer-implemented system 102, such as those shown in FIG. 1, capable of optimizing industrial assembly process in an industrial environment, in accordance with an embodiment of the present disclosure. The system 102 may also function as a computer-implemented system (hereinafter referred to as the system 102). The system 102 comprises the one or more hardware processors 110, the memory 112, and a storage unit 204. The one or more hardware processors 110, the memory 112, and the storage unit 204 are communicatively coupled through a system bus 202 or any similar mechanism. The memory 112 comprises a plurality of modules 114 in form of programmable instructions executable by the one or more hardware processors 110.

Further, the plurality of modules 114 includes a query receiving module 206, a performance attribute determining module 208, an artificial intelligence (AI) based language module 210, a response outputting module 212, a response simulating module 214, and a command generating module 216.

The one or more hardware processors 110, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 110 may also include embedded controllers, such as generic or programmable logic devices or arrays, application-specific integrated circuits, single-chip computers, and the like.

The memory 112 may be a non-transitory volatile memory and a non-volatile memory. The memory 112 may be coupled to communicate with the one or more hardware processors 110, such as being a computer-readable storage medium. The one or more hardware processors 110 may execute machine-readable instructions and/or source code stored in the memory 112. A variety of machine-readable instructions may be stored in and accessed from the memory 112. The memory 112 may include any suitable elements for storing data and machine-readable instructions, such as read-only memory, random access memory, erasable programmable read-only memory, electrically erasable programmable read-only memory, a hard drive, a removable media drive for handling compact disks, digital video disks, diskettes, magnetic tape cartridges, memory cards, and the like. In the present embodiment, the memory 112 includes the plurality of modules 114 stored in the form of machine-readable instructions on any of the above-mentioned storage media and may be in communication with and executed by the one or more hardware processors 110.

The storage unit 204 may be a cloud storage or a database such as those shown in FIG. 1. The storage unit 204 may store, but is not limited to, industrial data, manufacturing domain data, skills data, organization-specific data, continuous improvement (CI) data, quality management system (QMS) data, enterprise resource planning (ERP) data, external tools data, knowledge services data, factory floor data, logistics chain statistics data, internet of things (IoT) analytics data, image data, and sensor data, any other data, and combinations thereof. The storage unit 204 may be any kind of database such as, but are not limited to, relational databases, dedicated databases, dynamic databases, monetized databases, scalable databases, cloud databases, distributed databases, any other databases, and a combination thereof.

In an exemplary embodiment, the query receiving module 206 may receive a user command from a user on at least one of an artificial intelligence (AI) based conversational platform and a graphical user interface platform (not shown). The user command includes a query associated with an industrial assembly process. In an exemplary embodiment, the performance attribute determining module 208 may identify a type of the industrial assembly process indicated in the received user command by extracting at least one of one or more keywords and interaction of visual elements comprised in the received user command. In an exemplary embodiment, the performance attribute determining module 208 may determine one or more performance attributes associated with the identified type of industrial assembly process based on a trained AI based classification table.

In an exemplary embodiment, the artificial intelligence (AI) based language module 210 may apply the determined one or more performance attributes to a trained AI based language model. The AI based model may a language models (LMs). The LMs may be trained using, but not limited to, general purpose transformers (GPT), reinforcement learning through human feedback (RLHF) approaches, and the like. The determined one or more performance attributes are mapped to, but not limited to, domain knowledge, data associated with organization-specific knowledge bases, data from tools and internet-based services, statistics and measurements obtained from an industrial environment, and the like.

In an exemplary embodiment, the artificial intelligence (AI) based language module 210 may generate a response to the received user command based on results of the trained AI based language model. The response includes, but not limited to, one or more insights on performance level of the industrial assembly process, recommendations to current industrial assembly process, actuation commands to operate one or more machinery deployed in an industrial environment or an industrial automation environment, and the like.

In an exemplary embodiment, the response outputting module 212 may output the generated response on at least one of the AI based conversational platform and a graphical user interface platform in one or more representation forms. In an exemplary embodiment, the response simulating module 214 may simulate the generated response in a simulation environment based on the results of the trained AI based language model.

In an exemplary embodiment, the command generating module 216 may generate one or more actuation commands to operate the one or more machinery deployed in the industrial environment. Further, the command generating module 216 may transmit the generated one or more actuation commands to the one or more control stations at the industrial environment.

In an exemplary embodiment, the AI based language module 210 may obtain at least one of, the domain knowledge, the data associated with organization-specific knowledge bases, the data from tools and internet-based services, and the statistics and measurements obtained from the industrial environment, from one or more external data sources via a communication channel. The communication channel may include, but not be limited to, application programming interface (API) call. In an exemplary embodiment, the AI based language module 210 may train an AI based language model based on the obtained at least one of the domain knowledge, the data associated with organization-specific knowledge bases, the data from tools and internet-based services, and the statistics and measurements obtained from the industrial environment.

In an exemplary embodiment, to generate the response to the received user command based on results of the trained AI based language model, the AI based language module 210 may compare the determined one or more performance attributes with real-time one or more performance attributes. In an exemplary embodiment, the AI based language module 210 may determine the performance level of the industrial assembly process based on the comparison. In an exemplary embodiment, the AI based language module 210 may generate the response comprising the one or more insights on the determined performance level.

In an exemplary embodiment, to generate the response to the received user command based on results of the trained AI based language model, the AI based language module 210 may determine state of the current industrial assembly process based on the results of the trained AI based language model. The state of the current industrial assembly process comprises, but not limited to, normal, abnormal, critical, and the like. In an exemplary embodiment, the AI based language module 210 may determine pre-recorded events corresponding to the determined state of the current industrial assembly process based on historical data. In an exemplary embodiment, the AI based language module 210 may generate recommendations to current industrial assembly process based on the determined state of the current industrial assembly process and the determined pre-recorded events. The recommendations comprise one or more instructions to improve the performance of the current industrial assembly process.

In an exemplary embodiment, to generate the response to the received user command based on results of the trained AI based language model, the AI based language module 210 may determine root cause of the determined state of the current industrial assembly process based on the determined one or more performance attributes, the determined pre-recorded events, domain knowledge, the data associated with organization-specific knowledge bases, the data from tools and internet-based services, and the statistics and measurements obtained from the industrial environment. In an exemplary embodiment, the AI based language module 210 may generate recommendations to current industrial assembly process based on the determined root cause of the determined state of the current industrial assembly process.

Further, to determine the one or more performance attributes associated with the identified type of industrial assembly process based on the trained AI based classification table, the performance attribute determination module 208 may map the identified type of industrial assembly process to one or more pre-stored industrial assembly processes stored in the trained AI based classification table. In an exemplary embodiment, the performance attribute determination module 208 may retrieve one or more performance attributes associated with a real-time ongoing industrial assembly process from the industrial environment using one or more APIs. In an exemplary embodiment, the performance attribute determination module 208 determine the one or more performance attributes associated with the identified type of industrial assembly process based on the mapping and based on the retrieved one or more performance attributes associated with the real-time ongoing industrial assembly process.

In an exemplary embodiment, to output the generated response on at least one of the AI based conversational platform and a graphical user interface platform in one or more representation forms, the response outputting module 212 may generate one or more AI based insights for the generated response using one or more machine learning models. In an exemplary embodiment, the response outputting module 212 may display the generated one or more AI based insights on a user interface of a user device.

Figure 3:
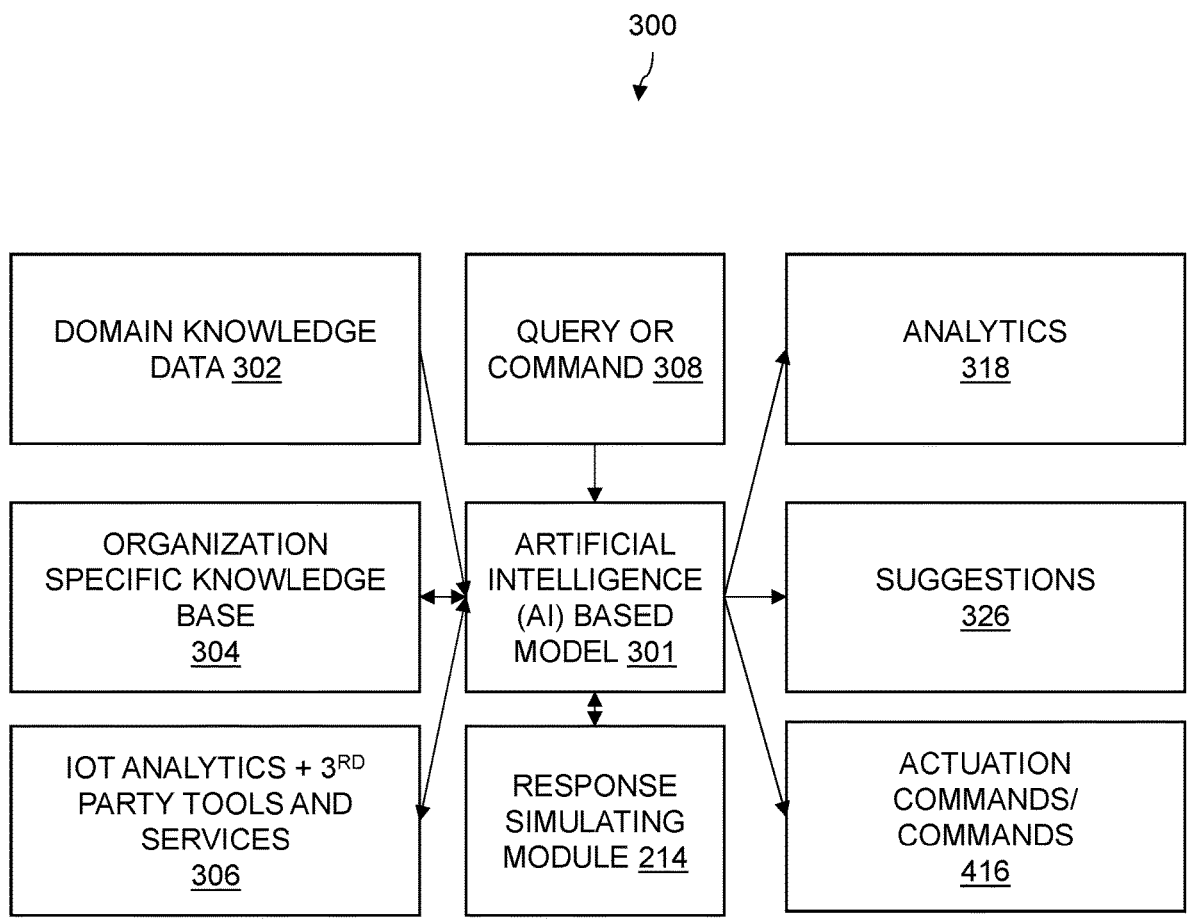
FIG. 3 illustrates an exemplary block diagram representation of method of training and processing the system, in accordance with an embodiment of the present disclosure.

FIG. 3 illustrates an exemplary block diagram representation of method 300 of training and processing the system 102, in accordance with an embodiment of the present disclosure. For example, for language models (LMs) based industrial process management (e.g., AI based model 301), the system 102 may use at least one of externals sources of knowledge, such as (i) industrial and manufacturing domain knowledge e.g., that obtained from textbooks, technical papers, and trade magazines, (ii) organization-specific knowledge e.g., obtained from continuous improvement (CI) systems, quality management systems (QMS), enterprise resource planning (ERP) system, and the like (iii) external tools and knowledge services e.g., calculator software, internet search engine, and the like, (iv) factory floor and logistics chain statistics e.g., obtained from cameras and computer vision systems and/or obtained from sensors and/or obtained by manual entries by humans. In an exemplary embodiment, the LMs are trained using approaches e.g., general purpose transformers (GPT) and/or reinforcement learning through human feedback (RLHF) approaches. In an exemplary embodiment, the LMs may access external application programming interface (APIs) by generating special tokens The tokens may include <api> token or any other unique token. In an exemplary embodiment, a model training and/or access to APIs are provided by any other approaches. In an exemplary embodiment, the LMs are used to just search and access information on which it is trained. In an exemplary embodiment, the LMs are used to make novel connections between ideas contained in its training data to answer queries or perform analyses. In an exemplary embodiment, the LMs are used to suggest improvements to existing processes by leveraging insights related to similar processes in training dataset and process measurements. In an exemplary embodiment, the LMs are used to directly call APIs to control one or more factory processes.

Further, the system 102 may retrieve domain knowledge data 302 from the database 104. The domain knowledge data 302 may include knowledge-bases available on the internet and/or general industrial and manufacturing engineering know-how and skills, e.g., contained in related textbooks, technical and research papers, and trade magazines, blog, and the like. Further, the database 104 may include organization-specific knowledge bases 304. The organization-specific knowledge base 304 may be knowledge specific to an industry vertical and/or organization, for example, automotive and/or a specific company. In some embodiments, the organization-specific knowledge base 304 may be obtained from continuous improvement (CI) systems, quality management systems (QMS), and/or enterprise resource planning (ERP) systems. Additionally, the database 104 may include internet of things (IoT) analytics and/or third-party tools and services, i.e., readings obtained by sensors and humans on actual processes on the factory, as well as external tools e.g., calculators and internet services e.g., search engines. In an exemplary embodiment, the analytics services and/or third-party tools and services may be queried through API calls. In some embodiments, such API calls may be indicated by the LM in an output through specialized tokens.

In an exemplary embodiment, the system 102 may receive a query or command 308 from the user. For example, the query or command 308 may be a question or a natural language command for the LMs. The LMs (AI-based model 301), for example, machine learning (ML) model may be trained on large datasets that include natural language among other kinds of data. In some embodiments, the LMs may be implemented as a General-Purpose Transformer (GPT). Furthermore, the response simulating module 214 may be a discrete event simulator that reasons regrading counterfactuals leveraging true physical models. In an exemplary embodiment, the LMs may request certain simulations to be performed who results are then used by the LM in its analysis or prescription. In an exemplary embodiment, the system 102 may perform analytics 318, in which analysis output may depend upon query or command. Further, the analytics 318 by the system 102 may use existing knowledge potentially including measurements and observations to answer the input query. Depending upon input query or command, the system 102 may output suggestions 326 to improve existing processes or design new processes. In an exemplary embodiment, the system 102 may provide or receive actuation commands 416. Depending upon a query or command from the user, the system 102 may generate commands for machinery e.g., robots and other kinds of automation, including sensors for instance for changing a mode of data acquisition.

Figure 4:
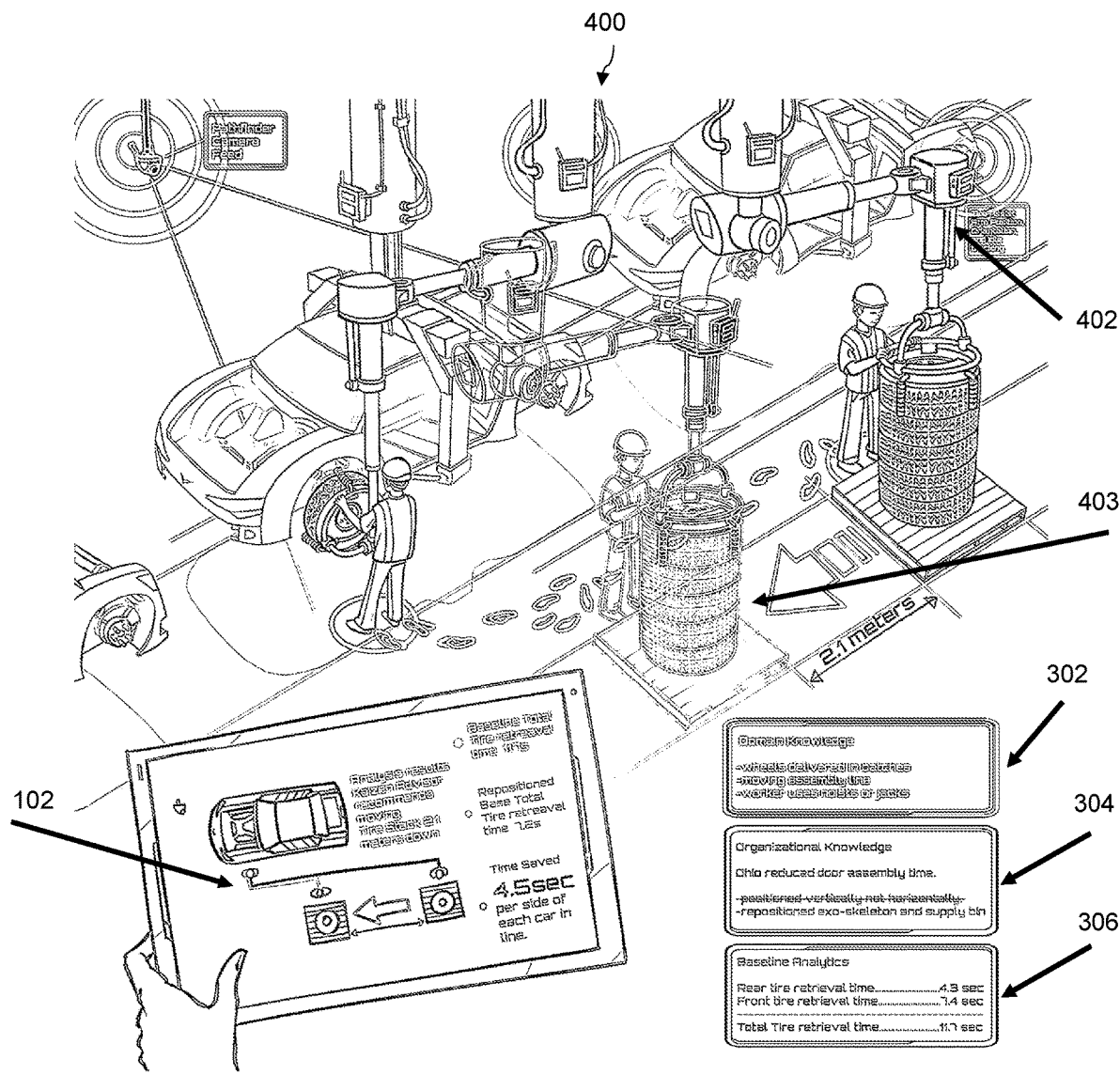
FIG. 4 illustrates an exemplary schematic diagram representation of an exemplary scenario, in accordance with an embodiment of the present disclosure.

FIG. 4 illustrates an exemplary schematic diagram representation of an exemplary scenario 400, in accordance with an embodiment of the present disclosure. Consider a use case which utilizes domain knowledge data 302, on how tires are generally installed on cars on moving assembly lines as well as an organizational specific knowledge base 304. The organizational specific knowledge base 304 may include a specific instance of process improvement, where a car door assembly process (as opposed to tire installation)

may have been optimized in the past by industrial experts and recorded, and analytics 318 which may be measured using current cycle time, to optimize a process on an automotive assembly line. Specifically, the use case depicts optimizing the tire installation process by using an exoskeleton system 402 to move a heavy tire and align it to a car. The system 102 may recommend a new location for the supply bin based on learning from the related event of improving car door assembly process found in the organizational knowledge-base, and baseline timing analytics from IoT sensors or cameras 306. The system may further simulate or fine-tune in a physical simulator such as response simulating module 214, potential alternatives for placement of the supply bin. The response simulating module 214 may be a physics-based discrete event simulation engine in this case. The system 102 may include a web-based user interface (UI) and/or mobile based user interface (UI) for suggestions 326, for example, moving the supply bin by 2.1 meters may improve the cycle time for this process by 4.5 seconds.

In another example, a benchtop assembly process for a smartphone assembly may be optimized by the system 102 for motion economy to speed up the process, process quality, and ergonomics. In this example, the domain knowledge 302 may comprise the concept of "Therbligs" introduced by Industrial Engineering pioneers Frank and Lilian Gilbreth which break down the manual assembly process into standardized 18 elemental motions such as "move", "grasp", "hold", "position" etc. In this case, relevant Domain knowledge may further include "Therblig" analysis checklists, which have a list of generic suggestions corresponding to each elemental motions. The organizational knowledge base 304 may constitute appearance of and preference for certain tools that this particular smartphone assembly line utilizes. The IOT and Sensor Analytics 306 here may include time measured on individuals steps of the process, assembly mistakes detected by a test station, or worker's body postures measured by a camera system. The Query or command 308 in this case may include a video clip corresponding to the assembly process as well as a user asking for Motion Economy or Ergonomics or Quality Control related guidelines either as text command or click-based command on a Graphical User Interface. The suggestions 326 provided as output from the system 102 maybe alternative fixtures, bin placements, power tools, hand tools or cobots, and body postures amongst others. The system may also generate actuation commands 416 for a collaborative robot (Cobot) as a way of optimizing the process.

To train the system 102, LM model, training procedures, and API-calling mechanisms may be chosen from the large variety of off-the-shelf options of machine learning approaches. Domain-specific training data may be collected from for example, books, white papers, industrial process records in various forms e.g., spreadsheets with pictures, videos, CAD simulations, and the like., or some combination in some embodiments. In some embodiments, humans could be hired specifically to collect such data from factories or warehouses, distribution centers and the like. The various types of optimization algorithm, objective function, Machine Learning model architecture, and human feedback amongst others may be chosen from the large variety of off-the-shelf options as well. These options include but are not limited to: stochastic gradient descent, adaptive moment estimation, adaptive gradient algorithm, root mean square propagation, adadelta, layer-wise adaptive moments optimizer for batch training for the optimization algorithm that is used to train orfine-tune the machine learning model or Language model; negative log likelihood (NLL), cross-entropy loss, ranking losses (hinge loss, pairwise loss etc), reinforcement learning objectives such as policy gradient or reinforce forthe objective function that directs the machine learning model; dolly, pythia, bloom, openllama, replit code, openflamingo amongst many others for the machine learning model architecture. Similarly, human feedback can be provided to improve machine learning model quality in a variety of ways e.g. different variants reinforcement learning with human feedback (RLHF) such as using a learned agent where humans provided scores on the actions taken iteratively to learn a reward model or using an actor-critic algorithm, where human feedback (both positive and negative) is used to tune the advantage function. Human feedback can also be provided through manual dataset curation, fine-tuning with human annotators, active learning, as well as userfeedback loops amongst others.

Figure 5:
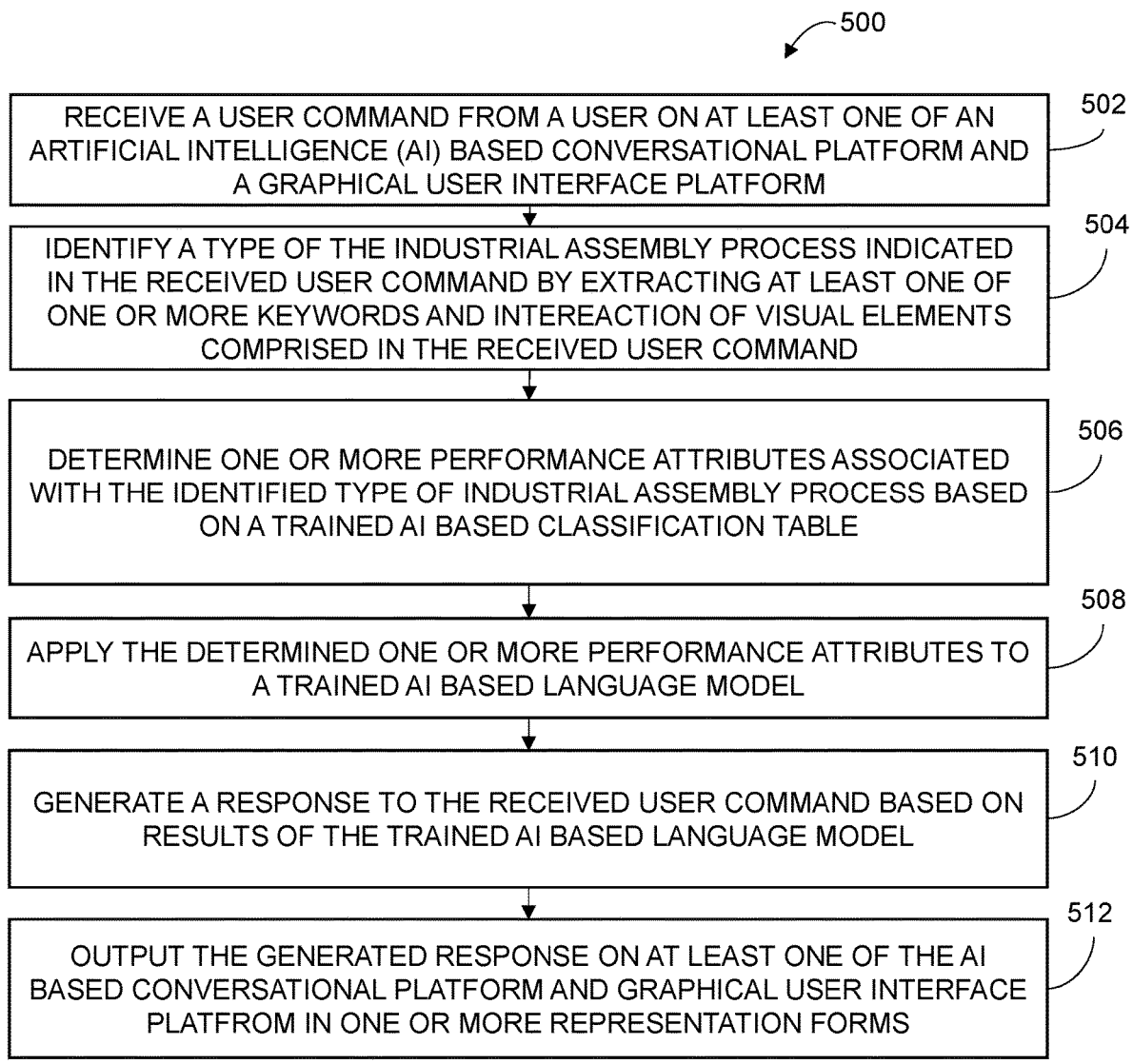
FIG. 5 illustrates a flow chart depicting a method of optimizing industrial assembly process in an industrial environment, in accordance with the embodiment of the present disclosure.

FIG. 5 illustrates a flow chart depicting a method 500 of optimizing industrial assembly process in an industrial environment, in accordance with the embodiment of the present disclosure.

At block 502, the method 500 may include receiving, by one or more hardware processors 110, a user command from a user on an at least one of artificial intelligence (AI) based conversational platform and a graphical user interface platform. The user command includes a query associated with an industrial assembly process.

At block 504, the method 500 may include identifying, by the one or more hardware processors 110, a type of the industrial assembly process indicated in the received user command by extracting at least one of one or more keywords and interaction of visual elements comprised in the received user command.

At block 506, the method 500 may include determining, by the one or more hardware processors 110, one or more performance attributes associated with the identified type of industrial assembly process based on a trained AI based classification table.

At block 508, the method 500 may include applying, by the one or more hardware processors 110, the determined one or more performance attributes to a trained AI based language model. The determined one or more performance attributes are mapped to at least one of domain knowledge, data associated with organization-specific knowledge bases, data from tools and internet-based services, and statistics and measurements obtained from an industrial environment.

At block 510, the method 500 may include generating, by the one or more hardware processors 110, a response to the received user command based on results of the trained AI based language model. The response comprises at least one of one or more insights on performance level of the industrial assembly process, recommendations to current industrial assembly process, and actuation commands to operate one or more machinery deployed in the industrial environment.

At block 512, the method 500 may include outputting, by the one or more hardware processors 110, the generated response on at least one of the AI based conversational platform and the graphical user interface platform in one or more representation forms.

The method 500 may be implemented in any suitable hardware, software, firmware, or combination thereof. The order in which the method 500 is described is not intended to be construed as a limitation, and any number of the described method blocks may be combined or otherwise performed in any order to implement the method 500 or an alternate method. Additionally, individual blocks may be deleted from the method 500 without departing from the spirit and scope of the present disclosure described herein. Furthermore, the method 500 may be implemented in any suitable hardware, software, firmware, or a combination thereof, that exists in the related art or that is later developed. The method 500 describes, without limitation, the implementation of the system 102. A person of skill in the art will understand that method 500 may be modified appropriately for implementation in various manners without departing from the scope and spirit of the disclosure.

Figure 6:
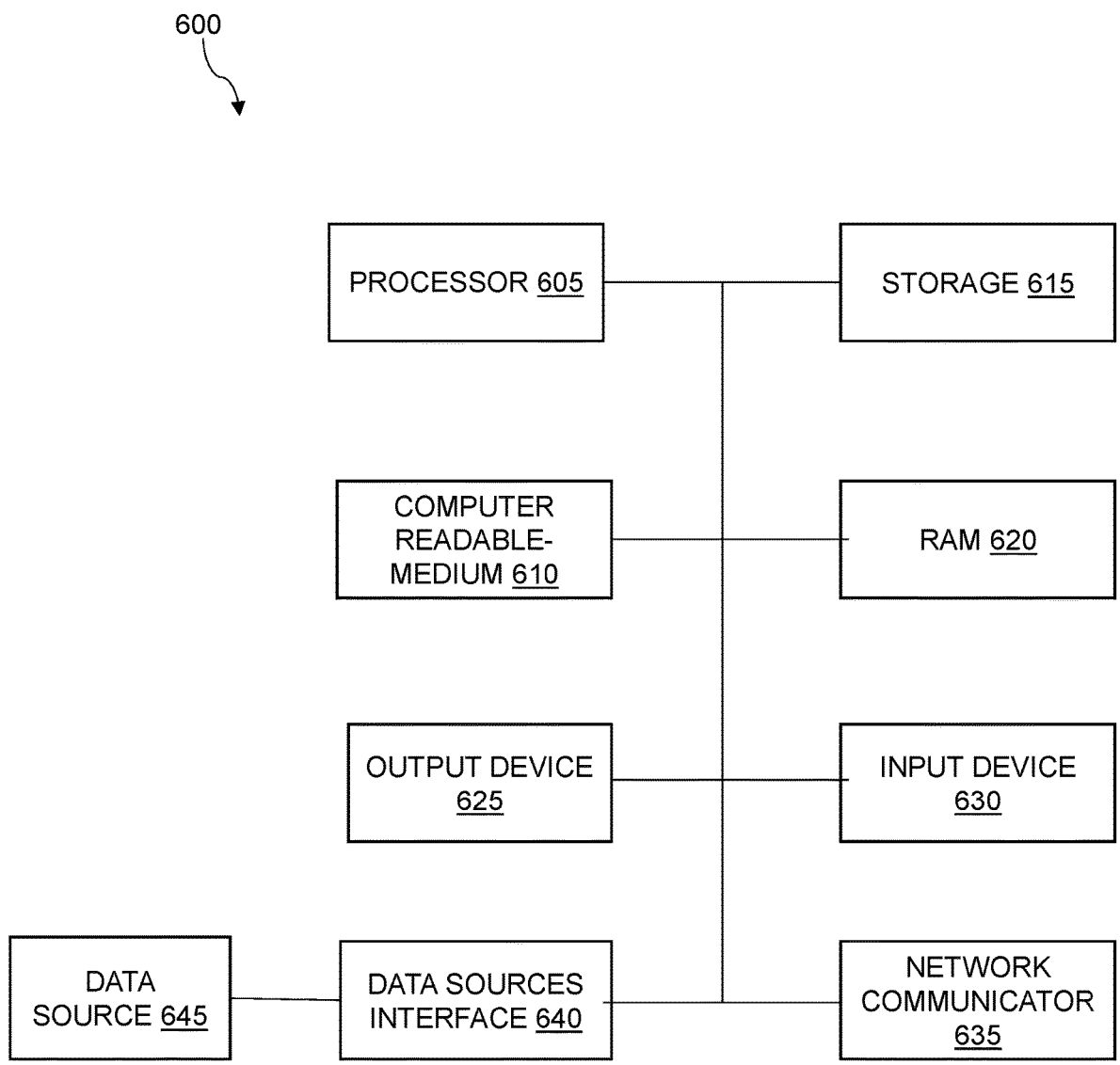
FIG. 6 illustrates an exemplary block diagram representation of a hardware platform for implementation of the disclosed system, according to an example embodiment of the present disclosure.

FIG. 6 illustrates an exemplary block diagram representation of a hardware platform 600 for implementation of the disclosed system 102, according to an example embodiment of the present disclosure. For the sake of brevity, the construction, and operational features of the system 102 which are explained in detail above are not explained in detail herein. Particularly, computing machines such as but not limited to internal/external server clusters, quantum computers, desktops, laptops, smartphones, tablets, and wearables may be used to execute the system 102 or may include the structure of the hardware platform 600. As illustrated, the hardware platform 600 may include additional components not shown, and some of the components described may be removed and/or modified. For example, a computer system with multiple GPUs may be located on external-cloud platforms including Amazon Web Services, internal corporate cloud computing clusters, or organizational computing resources.

The hardware platform 600 may be a computer system such as the system 102 that may be used with the embodiments described herein. The computer system may represent a computational platform that includes components that may be in a server or another computer system. The computer system may be executed by the processor 605 (e.g., single, or multiple processors) or other hardware processing circuits, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 605 that executes software instructions or code stored on a non-transitory computer-readable storage medium 610 to perform methods of the present disclosure. The software code includes, for example, instructions to gather data and analyze the data. For example, the plurality of modules 114 includes an interaction model generation module 206, an Artificial Superintelligence (ASI) interface generation module 208, a pattern and issue identification module 210, a machine learning module 212, and an ASI interface optimizer module 214.

The instructions on the computer-readable storage medium 610 are read and stored the instructions in storage 615 or random-access memory (RAM). The storage 615 may provide a space for keeping static data where at least some instructions could be stored for later execution. The stored instructions may be further compiled to generate other representations of the instructions and dynamically stored in the RAM such as RAM 620. The processor 605 may read instructions from the RAM 620 and perform actions as instructed.

The computer system may further include the output device 625 to provide at least some of the results of the execution as output including, but not limited to, visual information to users, such as external agents. The output device 625 may include a display on computing devices and virtual reality glasses. For example, the display may be a mobile phone screen or a laptop screen. GUIs and/or text may be presented as an output on the display screen. The computer system may further include an input device 630 to provide a user or another device with mechanisms for entering data and/or otherwise interacting with the computer system. The input device 630 may include, for example, a keyboard, a keypad, a mouse, or a touchscreen. Each of these output devices 625 and input device 630 may be joined by one or more additional peripherals. For example, the output device 625 may be used to display the results such as bot responses by the executable chatbot.

A network communicator 635 may be provided to connect the computer system to a network and in turn to other devices connected to the network including other clients, servers, data stores, and interfaces, for example. A network communicator 635 may include, for example, a network adapter such as a LAN adapter or a wireless adapter. The computer system may include a data sources interface 640 to access the data source 645. The data source 645 may be an information resource. As an example, a database of exceptions and rules may be provided as the data source 645. Moreover, knowledge repositories and curated data may be other examples of the data source 645.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer-readable medium can be any apparatus that can comprise, store, communicate, propagate, or transport the program for use by or in connection with the instruction execution system, apparatus, or device.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed.

Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limited, of the scope of the invention, which is outlined in the following claims.

We claim:

1. A computer-implemented system for optimizing industrial assembly process in an industrial environment, the system comprising:
    one or more hardware processors;
    a memory coupled to the one or more hardware processors, wherein the memory comprises a plurality of modules in form of programmable instructions executable by the one or more hardware processors, and wherein the plurality of modules comprises:
        a query receiving module configured for receiving a user command from a user on at least one of an artificial intelligence (AI) based conversational platform and a graphical user interface platform, wherein the user command comprises a query associated with an industrial assembly process;
        a performance attribute determining module configured for:
            identifying a type of the industrial assembly process indicated in the received user command by extracting at least one of one or more keywords and interaction of visual elements comprised in the received user command; and
            determining one or more performance attributes associated with the identified type of industrial assembly process based on a trained AI based classification table;
        an artificial intelligence (AI) based language module configured for:
            applying the determined one or more performance attributes to a trained AI based language model, wherein the determined one or more performance attributes are mapped to at least one of domain knowledge, data associated with organization-specific knowledge bases, data from tools and internet-based services, and statistics and measurements obtained from an industrial environment; and
            generating a response to the received user command based on results of the trained AI based language model, wherein the response comprises at least one of one or more insights on performance level of the industrial assembly process, recommendations to current industrial assembly process, and actuation commands to operate one or more machinery deployed in the industrial environment, wherein in generating the response, the AI based language module is configured for:
                determining a root cause of a state of the current industrial assembly process based on the determined one or more performance attributes, determined prerecorded events, domain knowledge, the data associated with organization-specific knowledge bases, the data from tools and internet-based services, and the statistics and measurements obtained from the industrial environment; and
                generating recommendations to the current industrial assembly process based on the determined root cause of the determined state of the current industrial assembly process; and
        a response outputting module configured for outputting the generated response on at least one of the AI based conversational platform and the graphical user interface platform in one or more representation forms.

2. The computer-implemented system of claim 1, further comprising a response simulating module configured for:
    simulating the generated response in a simulation environment based on the results of the trained AI based language model.

3. The computer-implemented system of claim 1, further comprising a command generating module configured for:
    generating one or more actuation commands to operate the one or more machinery deployed in an industrial environment; and
    transmitting the generated one or more actuation commands to the one or more control stations in an industrial environment.

4. The computer-implemented system of claim 1, wherein the AI based language module is further configured for:
    obtaining at least one of, the domain knowledge, the data associated with organization-specific knowledge bases, the data from tools and internet-based services, and the statistics and measurements obtained from the industrial environment, from one or more external data sources via a communication channel; and
    training an AI based language model based on the obtained at least one of the domain knowledge, the data associated with organization-specific knowledge bases, the data from tools and internet-based services, and the statistics and measurements obtained from the industrial environment.

5. The computer-implemented system of claim 1, wherein in generating the response to the received user command based on results of the trained AI based language model, the AI based language module is configured for:
    comparing the determined one or more performance attributes with real-time one or more performance attributes;
    determining the performance level of the industrial assembly process based on the comparison; and
    generating the response comprising the one or more insights on the determined performance level.

6. The computer-implemented system of claim 1, wherein in generating the response to the received user command based on results of the trained AI based language model, the AI based language module is configured for:
- determining state of the current industrial assembly process based on the results of the trained AI based language model, wherein the state of the current industrial assembly process comprise at least one of: normal, abnormal, and critical;
- determining pre-recorded events corresponding to the determined state of the current industrial assembly process based on historical data; and
- generating recommendations to current industrial assembly process based on the determined state of the current industrial assembly process and the determined pre-recorded events, wherein the recommendations comprise one or more instructions to improve performance of the current industrial assembly process.

7. The computer-implemented system of claim 1, wherein in determining the one or more performance attributes associated with the identified type of industrial assembly process based on the trained AI based classification table, the performance attribute determination module is configured for: mapping the identified type of industrial assembly process to one or more pre-stored industrial assembly processes stored in the trained AI based classification table; retrieving one or more performance attributes associated with a real-time ongoing industrial assembly process from the industrial environment using one or more application programming interfaces (APIs); and determining the one or more performance attributes associated with the identified type of industrial assembly process based on the mapping and based on the retrieved one or more performance attributes associated with the real-time ongoing industrial assembly process.

8. The computer-implemented system of claim 1, wherein in outputting the generated response on at least one of the AI based conversational platform and the graphical user interface platform in one or more representation forms, the response output module is configured for:
- generating one or more AI based insights for the generated response using one or more machine learning models; and
- displaying the generated one or more AI based insights on a user interface of a user device.

9. A computer-implemented method for optimizing industrial assembly process in an industrial environment, the computer-implemented method comprising:
- receiving, by one or more hardware processors, a user command from a user on an at least one of artificial intelligence (AI) based conversational platform and a graphical user interface platform, wherein the user command comprises a query associated with an industrial assembly process;
- identifying, by the one or more hardware processors, a type of the industrial assembly process indicated in the received user command by extracting at least one of one or more keywords and interaction of visual elements comprised in the received user command;
- determining, by the one or more hardware processors, one or more performance attributes associated with the identified type of industrial assembly process based on a trained AI based classification table;
- applying, by the one or more hardware processors, the determined one or more performance attributes to a trained AI based language model, wherein the determined one or more performance attributes are mapped to at least one of domain knowledge, data associated with organization-specific knowledge bases, data from tools and internet-based services, and statistics and measurements obtained from an industrial environment;
- generating, by the one or more hardware processors, a response to the received user command based on results of the trained AI based language model, wherein the response comprises at least one of one or more insights on performance level of the industrial assembly process, recommendations to current industrial assembly process, and actuation commands to operate one or more machinery deployed in the industrial assembly environment, wherein in generating the response, the AI based language module is configured for:
  - determining a root cause of a state of the current industrial assembly process based on the determined one or more performance attributes, determined pre-recorded events, domain knowledge, the data associated with organization-specific knowledge bases, the data from tools and internet-based services, and the statistics and measurements obtained from the industrial environment; and
  - generating recommendations to the current industrial assembly process based on the determined root cause of the determined state of the current industrial assembly process; and
- outputting, by the one or more hardware processors, the generated response on at least one of the AI based conversational platform and a graphical user interface platform in one or more representation forms.

10. The computer-implemented method of claim 9, further comprising:
- simulating, by the one or more hardware processors, the generated response in a simulation environment based on the results of the trained AI based language model.

11. The computer-implemented method of claim 9, further comprising:
- generating, by the one or more hardware processors, one or more actuation commands to operate the one or more machinery deployed in the industrial environment; and
- transmitting, by the one or more hardware processors, the generated one or more actuation commands to the one or more control stations at the industrial environment.

12. The computer-implemented method of claim 9, further comprising:
- obtaining, by the one or more hardware processors, at least one of, the domain knowledge, the data associated with organization-specific knowledge bases, the data from tools and internet-based services, and the statistics and measurements obtained from the industrial environment, from one or more external data sources via a communication channel and
- training, by the one or more hardware processors, an AI based language model based on the obtained at least one of the domain knowledge, the data associated with organization-specific knowledge bases, the data from tools and internet-based services, and the statistics and measurements obtained from the industrial environment.

13. The computer-implemented method of claim 9, wherein generating the response to the received user command based on results of the trained AI based language model comprises:
- comparing, by the one or more hardware processors, the determined one or more performance attributes with real-time one or more performance attributes;

determining, by the one or more hardware processors, the performance level of the industrial assembly process based on the comparison; and generating, by the one or more hardware processors, the response comprising the one or more insights on the determined performance level.

14. The computer-implemented method of claim 9, wherein generating the response to the received user command based on results of the trained AI based language model comprises:

determining, by the one or more hardware processors, state of the current industrial assembly process based on the results of the trained AI based language model, wherein the state of the current industrial assembly process comprise at least one of normal, abnormal, and critical;

determining, by the one or more hardware processors, pre-recorded events corresponding to the determined state of the current industrial assembly process based on historical data; and generating, by the one or more hardware processors, recommendations to current industrial assembly process based on the determined state of the current industrial assembly process and the determined pre-recorded events, wherein the recommendations comprise one or more instructions to improve performance of the current industrial assembly process.

15. The computer-implemented method of claim 9, wherein determining the one or more performance attributes associated with the identified type of industrial assembly process based on the trained AI based classification table comprises:

mapping, by the one or more hardware processors, the identified type of industrial assembly process to one or more pre-stored industrial assembly processes stored in the trained AI based classification table; retrieving, by the one or more hardware processors, one or more performance attributes associated with a real-time ongoing industrial assembly process from the industrial environment using one or more application programming interfaces (APIs); and determining, by the one or more hardware processors, the one or more performance attributes associated with the identified type of industrial assembly process based on the mapping and based on the retrieved one or more performance attributes associated with the real-time ongoing industrial assembly process.

16. The computer-implemented method of claim 9, wherein outputting the generated response on at least one of the AI based conversational platform and a graphical user interface platform in one or more representation forms comprise:

generating, by the one or more hardware processors, one or more AI based insights for the generated response using one or more machine learning models; and displaying, by the one or more hardware processors, the generated one or more AI based insights on a user interface of a user device.

17. A non-transitory computer-readable storage medium having instructions stored therein that, when executed by one or more hardware processors, cause the one or more hardware processors to perform method steps comprising:

receiving a user command from a user on at least one of an artificial intelligence (AI) based conversational platform and a graphical user interface platform, wherein the user command comprises a query associated with an industrial assembly process;

identifying a type of the industrial assembly process indicated in the received user command by extracting at least one of one or more keywords and interaction of visual elements comprised in the received user command;

determining one or more performance attributes associated with the identified type of industrial assembly process based on a trained AI based classification table;

applying the determined one or more performance attributes to a trained AI based language model, wherein the determined one or more performance attributes are mapped to at least one of domain knowledge, data associated with organization-specific knowledge bases, data from tools and internet-based services, and statistics and measurements obtained from an industrial environment;

generating a response to the received user command based on results of the trained AI based language model, wherein the response comprises at least one of one or more insights on performance level of the industrial assembly process, recommendations to current industrial assembly process, and actuation commands to operate one or more machinery deployed in the industrial environment, wherein in generating the response, the AI based language module is configured for:

determining a root cause of a state of the current industrial assembly process based on the determined one or more performance attributes, determined pre-recorded events, domain knowledge, the data associated with organization-specific knowledge bases, the data from tools and internet-based services, and the statistics and measurements obtained from the industrial environment; and generating recommendations to the current industrial assembly process based on the determined root cause of the determined state of the current industrial assembly process; and outputting the generated response on at least one of the AI based conversational platform and the graphical user interface platform in one or more representation forms.

18. The non-transitory computer-readable storage medium of claim 17, further comprises:

simulating the generated response in a simulation environment based on the results of the trained AI based language model.

* * * * *